No. 775,284. PATENTED NOV. 15, 1904.
H. FRANKEL.
ELECTRIC TESTING CLIP.
APPLICATION FILED DEC. 2, 1903.
NO MODEL.
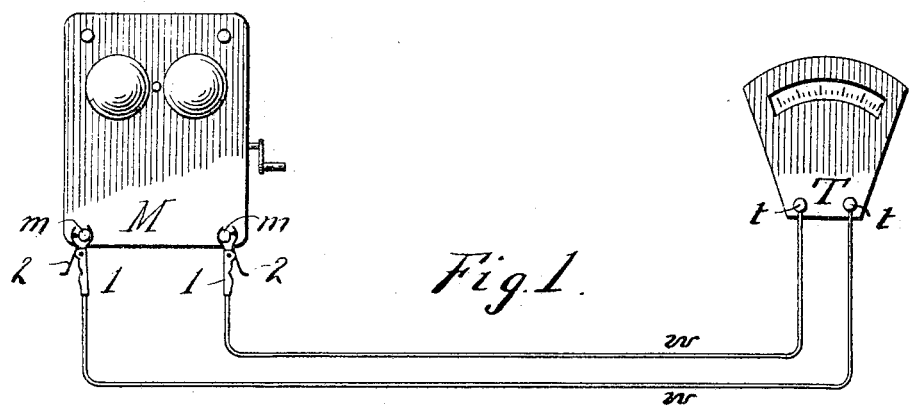
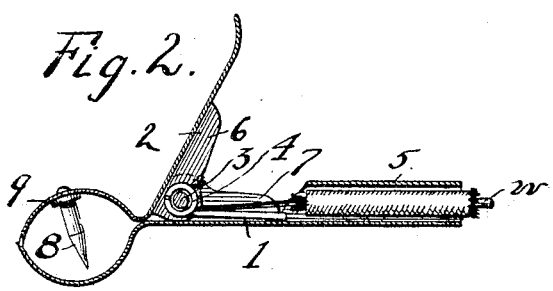
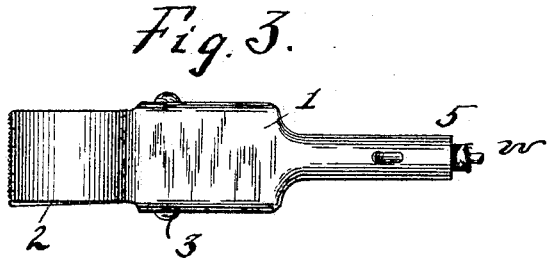
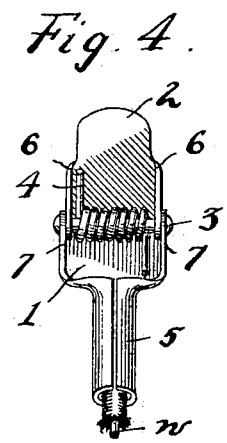
WITNESSES:
INVENTOR
Harry Frankel.
BY
ATTORNEY No. 775,284.                                           Patented November 15, 1904.

UNITED STATES PATENT OFFICE.

HARRY FRANKEL, OF NEW YORK, N. Y.

ELECTRIC TESTING-CLIP.

SPECIFICATION forming part of Letters Patent No. 775,284, dated November 15, 1904.

Application filed December 2, 1903. Serial No. 183,431. (No model.)

*To all whom it may concern:*

Be it known that I, HARRY FRANKEL, a citizen of the United States, residing at New York, in the county of New York and State of New York, have invented certain new and useful Improvements in Electric Testing-Clips, of which the following is a full, clear, and exact description.

My invention relates to improvements in devices for use by linemen and others engaged in electrical testing, and particularly to a clip for making temporary but quick and positive connections.

The object of the invention is to provide a simple and reliable construction which may be employed with electrical testing apparatus for making connections temporarily with points between which electrical conditions are to be determined.

It is often necessary in testing to make connections between points on binding-posts and on wires insulated and uninsulated.

This invention consists in a simple construction which is secured to an electric conductor or wire and which is adapted to be engaged and disengaged easily with and from binding-posts, the wires, and other metallic structures. It consists of a clip having two relatively pivoted members with a spring for normally forcing them together, so as to grip the body with which connection is desired. One member of each clip is provided with a sharp-pointed pin for making positive connection with corroded surfaces or for penetrating insulation of wires.

The construction and use will be plainly understood from an inspection of the accompanying single sheet of drawings, in which—

Figure 1 represents diagrammatically a telephone magneto-box and a testing instrument with my invention applied. Fig. 2 is a longitudinal cross-section of a single clip involving my invention, showing the end of the connecting-wire and the sharpened pin in side elevation. Fig. 3 is a view of the under side of the same clip, but with the connecting-wire attached in a different manner. Fig. 4 is a rear view of a testing-clip, showing the spring for throwing the parts into their relative gripping positions.

In the drawings, M represents a magneto-box of an electric telephone which may be suitably typical of the many forms of devices which it is desired often to test.

T represents an instrument for recording or indicating the conditions.

*m m* represent the binding-posts of the magneto, and *t t* the binding-posts of the testing instrument. The wires or conductors leading from the testing instrument to the magneto are represented by *w w*.

1 represents one member of the testing-clips, and 2 represents the other member pivoted in respect thereto. These two members are temporarily attached to the binding-posts *m m* for making the electrical connection.

In Figs. 2, 3, and 4 I have shown, on an enlarged scale, a testing-clip in detail. In these figures, 3 represents a pivot-pin connecting the two parts 1 and 2, and 4 is the spring for normally holding the two members with their gripping-points toward each other. The conductors or wires *w* are preferably insulated. I have provided the main member of the testing-clip 1 with a tubular portion 5 for better securing the wire *w* to the clip. In the form shown in Fig. 2 the end of the wire engages the pivot-pin 3, so as to afford a direct connection with both of the members 1 and 2. It will be understood from an inspection of Fig. 1 that the jaws of the testing-clip grip the member with which electrical connection is desired. In the form shown in Fig. 3 the end of the wire *w* is passed downward through a hole or perforation in the bottom and held therein. In this form the connection from the member 2 is indirectly through the pivot to the member 1. The sides of the members 1 and 2 are bent down, as at 6 and 7, to form ears to afford a bearing for the pivot-pin 3.

In order to effect a more positive and certain connection with parts which are covered with dirt or corrosion or insulated, I provide the pin 8, which has a sharp point for engagement. This pin has formed integrally with it the shoulder 9 and is securely fastened to the member 2 by riveting the outer end. Electrical connection is therefore perfect between the pin and the member 2, and hence to the conductor.

The points of the serrated jaws afford positive engagement and a perfect electrical contact with whatever body connection is desired, penetrating any oxidization or other non-conducting surfaces. These uneven edges and strong spring action also prevent the clip from slipping.

The sharp-pointed pin will penetrate the insulation of a wire instantly, rendering it unnecessary to unwrap the insulation or to scrape the wire. It thus saves time and trouble without in any way permanently injuring the insulation of the wire, the perforations being instantly closed on account of the elasticity of the material of the insulation.

What I claim is—

An electrical testing-clip of the character described comprising a body member, a companion member pivoted thereto, both of said members having gripping-jaws, a spring for throwing said jaws into their normal gripping position, a lever carried by one of said jaws for engagement by the thumb, an electrical conductor connected with said clip, and a sharpened pin connected to one of said members for affording a positive electrical connection, the other member having a holding-cavity opposite said pin for the purpose specified.

Signed at New York, N. Y.

HARRY FRANKEL.

Witnesses:
ROBT. S. ALLYN,
L. VREELAND.